United States Patent
Spiess (10) Patent No.: US 7,475,604 B2
(45) Date of Patent: Jan. 13, 2009

(54) METHOD FOR MONITORING AN OIL AND GAS LUBRICATING DEVICE WITH THE AID OF A STRIAE SENSOR

(75) Inventor: Goetz Spiess, Berlin (DE)

(73) Assignee: Willy Vogel AG, Berlin (DE)

( * ) Notice: Subject to any disclaimer, the term of this patent is extended or adjusted under 35 U.S.C. 154(b) by 37 days.

(21) Appl. No.: 10/560,895

(22) PCT Filed: May 19, 2004

(86) PCT No.: PCT/EP2004/005427

§ 371 (c)(1),
(2), (4) Date: Nov. 21, 2006

(87) PCT Pub. No.: WO2004/113785

PCT Pub. Date: Dec. 29, 2004

(65) Prior Publication Data

US 2007/0095395 A1    May 3, 2007

(51) Int. Cl.
*G01F 1/20*    (2006.01)
(52) U.S. Cl. .................................................. 73/861.39
(58) Field of Classification Search ................. 73/53.05, 73/861.39
See application file for complete search history.

(56) References Cited

U.S. PATENT DOCUMENTS

| | | | |
|---|---|---|---|
| 4,741,885 A * | 5/1988 | Herbort et al. | .............. 422/197 |
| 5,461,236 A | 10/1995 | Gram et al. | |
| 6,131,471 A | 10/2000 | Okoren et al. | |

FOREIGN PATENT DOCUMENTS

| | | |
|---|---|---|
| DE | 20 54 822 | 5/1972 |
| JP | S61-270598 A | 11/1986 |
| JP | 02 271197 | 11/1990 |
| WO | 01/36861 | 5/2001 |

* cited by examiner

*Primary Examiner*—Jewel Thompson
(74) *Attorney, Agent, or Firm*—Oblon, Spivak, McClelland, Maier & Neustadt, P.C.

(57) ABSTRACT

A method is disclosed for monitoring an oil and gas lubricating device, with which an oil film, while forming striae, can be conveyed by an airflow along a wall of a supply line to a lubrication point, in which the temporal change in the striae is detected by a striae sensor, and a striae signal that is representative of the temporal change in the striae is generated. In order to further develop known methods for monitoring an oil and gas lubricating device, thereby preventing faults during the evaluation of the striae signal, the striae signal is smoothened by calculating an average value of the striae signal over a predetermined averaging interval.

24 Claims, 6 Drawing Sheets

METHOD FOR MONITORING AN OIL AND GAS LUBRICATING DEVICE WITH THE AID OF A STRIAE SENSOR

FIELD OF THE INVENTION

The invention relates to a method for monitoring an oil and gas lubricating device, with which an oil film, while forming striae, can be conveyed by an airflow along a wall of a supply line to a lubrication point, in which method the temporal change in the striae is detected by a striae sensor, and a striae signal is generated that is representative of the temporal change in the striae.

DISCUSSION OF BACKGROUND

Oil and gas lubricating devices are widespread and are used, for example, for supplying lubricant to high-speed spindles in modern machine tools. An unnoticed malfunction of the lubricant supply can lead to a malfunction of the device to be lubricated, e.g., a machine tool, and therefore to high consequential costs and problems, such as loss of production, for example. This clearly shows the need for a capability of automatically monitoring the supply of lubricant by an oil and gas lubricating device, because a subjective, visual monitoring, for example, by an operator, is too uncertain. The customary oil and gas lubricating devices are minimal quantity lubrications, in which the oil, instead of flowing in streams, flows only on the order of individual drops. These drops are pulled apart by an airflow and, in the form of a fine oil film, also called striae, conveyed along a wall of a supply line in the direction of a lubrication point, e.g., a spindle bearing. Such a limited quantity of oil hinders the monitoring of the lubricant supply by the oil and gas lubricating device that can be carried out with a justifiable effort.

DE 44 39 380 A1 discloses a lubricating device for minimal quality lubrication in which a sensor monitors the lubricant flow and records a temporal change in the lubricant flow. For example, the sensor can be a light barrier, whose detection beam penetrates the lubricant flow and the transparently constructed supply line thereof diametrically and whose detection beam is characteristically changed by the lubricant flow. A photoreceiver generates an electric striae signal that is representative of the lubricant flow or the striae and from which the presence and quality of the lubricant flow is derivable.

A further example for a method for monitoring an oil and gas lubricating device from the state of the art is described in WO 01/36861. In the method described in this publication, the temporal change in the lubricant flow is also registered by a striae sensor, and the striae sensor outputs an electrical striae signal that corresponds to the fluctuations in the lubricant flow.

Detrimental in the monitoring of an oil and gas lubricating device using the methods described in DE 44 39 380 A1 and WO 01/36861 is the faultiness of the striae signal as a result of strong, non-representative fluctuations and peaks. As a result, the significance of the striae signal is reduced, because a temporarily low striae signal is not unusual and also does not necessarily have to be connected with a fault in the oil and gas lubricating device. One risk that arises is that a malfunction in the oil and gas lubricating device may not be detected quickly enough, because the low striae signal is not sufficiently observed. On the other hand, it is also possible that the lubricated system is incorrectly switched off because of the temporarily indicated low striae signal, although the oil and gas lubricating device is working correctly. In both cases, unnecessary costs are created. The usability of the striae signal is accordingly considerably reduced as a result of its faultiness.

Furthermore, automatic evaluation of the striae signal is difficult because specifying a predetermined limit is made more difficult because of the faults in the striae signal.

SUMMARY OF THE INVENTION

Therefore, the object of the invention is the further development of the known methods for monitoring an oil and gas lubricating device in order to avoid faults when evaluating the striae signal.

The object is solved by the method mentioned above by means of smoothening the striae signal by calculating an average value of the striae signal over a predetermined averaging interval.

The advantage of this method is that the striae signal is freed of faults in a simple way by means of the smoothening. Therefore, it is ensured that when the striae signal assumes a certain value it is not the result of a temporarily, incorrect fluctuation.

The method according to the invention can be further developed by a number of advantageous, mutually independent developments. These developments and the advantages connected with each of these developments are briefly discussed in the following summary.

The smoothened striae signal can be compared to a predetermined operating limit according to one advantageous development, wherein this predetermined operating limit is representative of an oil film that is sufficient for lubrication appropriate for operation. If the operating limit is exceeded by the smoothened striae signal, an operating signal is output. The operating signal signals lubrication of the lubrication point that is appropriate for operation. At the same time, lubrication appropriate for operation signifies that the lubrication point is supplied with an amount of oil that is sufficient for operation suited to the use. In a roller bearing, for example, this means that the amount of oil, as calculated in the design of the roller bearing, needed to reach the guaranteed life cycle is supplied to the roller bearing. This is particularly advantageous, because the operating signal can also be used for automatic analysis, for example, by a machine control. Furthermore, if the level of the smoothened striae signal falls below the operating limit, a warning signal can be output, signalling that the lubrication point is not being lubricated in a manner appropriate for operation. The warning signal can likewise be automatically analyzed and can, for example, lead to switching off the device to be lubricated.

Furthermore, in an advantageous development, the smoothened striae signal can be compared to a predetermined warning limit that is representative of an oil film that is not sufficient for lubrication point lubrication that is appropriate for operation. If the smoothened striae signal falls below the warning limit, the warning signal is output. If the smoothened striae signal ranges between the warning limit and the operating limit, there is no change in the signal and the operating signal or the warning signal continues to be output. The advantage of this is that the reliability of the operating or warning signal is improved, because if the level falls below the operating limit by only a slight amount, the operating signal is not cancelled. Only when the smoothened striae signal also falls below the warning limit is the warning signal output, thereby cancelling the operating signal. In this way, stable operating behaviour is reached in the monitoring of the oil and gas lubricating device.

In an advantageous embodiment, the operating or warning limit can be read from a memory unit. Specification of the operating and / or warning limit is done depending on a normalization signal. The normalization signal can possibly be generated by pressing a particular combination of keys on the keyboard of an attached machine control at a time in the operation when there is lubrication that is appropriate for operation or not appropriate for operation, respectively. This has the advantage that the limits can be set very easily and in a time-saving manner. For example, a striae signal can be selected that is representative of an oil film that is satisfactory for lubrication point lubrication that is appropriate for operation and this striae signal can then be saved as the operating limit.

In a further advantageous development, specification of the operating or warning limit can be performed as a percentage or absolute deviation from the respective other limit that has already been specified. This has the advantage that only one of the two limits has to be specified by a selected striae signal, because, for example, setting a striae signal that is representative for the warning limit can be difficult. Furthermore, input of a limit as a deviation from the respective other limit is faster, which shortens the set-up time required for the oil and gas lubricating device.

In a further development, the averaging interval can be automatically shortened when the warning signal is output, wherein a long time interval and a short time interval can be specified. This has particularly advantageous consequences for the embodiment of the method according to the invention. For example, if the unsmoothened striae signal suddenly falls below the warning limit while the operating signal is being output, the warning signal will not be output until after expiration of the long time interval. In this way, a reliable and stable operating state arises in practical application, because the warning signal is only output when there is no striae signal in the average of the long time interval. The long time interval is selected to be only so long that operation without lubrication for the duration of the long time interval is harmless. On the other hand, when the warning signal is output, a quick response is desirable if there is again a sufficient oil film thickness, because, for example, this allows production to be started again. For this reason, the short time interval is selected as the averaging interval for calculating the average value of the striae signal while the warning signal is being output.

In an advantageous development, the striae signal that is representative for the temporal change of the striae can be generated opto-electronically, which has the advantage that an opto-electronic sensor, such as, for example, a photoreceiver, is sturdy and economical.

In a further advantageous development, the temperature of the oil film can be measured and the temperature of the oil film when the oil film and warning limits are specified can be saved. The striae signal is smoothened depending on the difference in the temperatures of the saved and measured temperature of the oil film. For this purpose, temperature-dependent characteristic values can be subtracted from or added to the striae signal as the striae signal is smoothened. Furthermore, it is conceivable that the striae signal is multiplied by a temperature-dependent factor for correction. These developments have the advantage that a striae signal changed due to temperature influences on the oil film can be compensated for. For example, the viscosity of the oil changes as the temperature varies, which leads to a change in the striae signal. The change in the striae signal is not connected to a change in the amount of the oil film, in this case, however, which would normally be the logical conclusion. Because the striae signal is smoothened by predetermined, temperature-dependent characteristic values, the striae signal is changed in such a way that the temperature influence on the oil film is compensated for.

In a further development, the striae signal can be compared to a predetermined malfunction limit while it is being smoothened, with this malfunction limit being representative for a striae signal when there is a malfunction in the airflow. If the unsmoothened striae signal falls below the malfunction limit, the warning signal is output. This has the advantage that a malfunction of the airflow and therefore the oil and gas lubricating device is detected quickly and leads to output of the warning signal. Without this development, the warning signal would not be output until a later point in time as a result of the malfunction of the airflow, conditional on the averaging interval when the striae signal is being smoothened. As a result of the output of the warning signal, there is a quick reaction to a restored oil film, in addition to the warning, conditional on the automatically reduced averaging interval that comes with the output of the warning signal.

In a further advantageous embodiment, the striae signal can be preconditioned before the smoothening by calculating an average value of the striae signal over a predetermined time interval. This preconditioning has the advantage that the striae signal is freed of initial errors.

Furthermore, in an advantageous development, the striae signal can be preconditioned by removing the constant portion from the striae signal. This has the advantage that portions of the striae signal that are always the same and not representative for the temporal change of the striae are removed from the striae signal. Removal of the constant portions can, for example, be handled by subtracting an average value, calculated over a predetermined time interval, from the striae signal. By removing the constant portions, offset errors that falsify the striae signal are compensated for.

The unsmoothened striae signal can be rectified during the preconditioning in a further advantageous embodiment. In this connection, negative values of the striae signal are changed to positive, whereby the magnitude of the striae signal remains unchanged. Because the striae signal is positive at all times after the rectification, subsequent striae signal evaluations are simplified. As a result of the rectification during the preconditioning, the striae signal continues to be representative, because only the magnitude is crucial for evaluating the striae signal, not the sign.

In a further advantageous development, the striae signal can be amplified to an average predetermined raw signal value in dependence on the preconditioned striae signal. This has the advantage that the striae signal, amplified to the raw signal value, is especially suitable for further processing. For example, the raw signal value can be an average input range value of a digitalization of the striae signal. The striae signal in this example can be regulated to the average input range value, whereby the preconditioned striae signal can be a control variable.

Furthermore, the amplification of the raw signal value can be compensated for by attenuating or damping the preconditioned striae signal. In this way, the previously performed amplification of the striae signal is compensated for by attenuation or damping with the same amplification factor and the striae signal remains unaltered. Attenuation or damping is a division by an amplification or damping factor, amplification is a multiplication. Likewise, it is conceivable that the previous amplification was performed with an amplification factor of <1, which amounts to an attenuation. In this case, the attenuation described here means division by the amplification factor of <1, which is the same as amplification. The result in any case would be compensation for the previous signal change.

In a further advantageous embodiment, a beam of light directed through the striae can be detected by the striae sensor and the striae signal can be generated depending on the beam of light. This has the advantage that the striae representatively change the beam of light, which is conveyed through them. The striae sensor can be a photoreceiver, for example. Photoreceivers are economical sensors that work reliably even under production conditions. In order for it to be possible to direct the beam of light through the striae, the supply line of the oil and gas lubricating device can, for example, be composed of a transparent glass tube. This is particularly advantageous, because the glass tube is not corroded by the oil and permanently maintains a constant transparency.

Furthermore, the beam of light that is directed through the striae can be generated with a light source.

In an advantageous development, the striae signal can be calibrated by controlling the light intensity of the light source. In this way, for example, it is possible to set a working point for the striae sensor.

Furthermore, the striae signal can be calibrated by controlling the light intensity of the light source to a predetermined test intensity. In this way, the various process steps can be checked and adjusted. For example, the test intensity can be a predetermined, harmonically oscillating intensity that must emerge in the striae signal in a predetermined manner.

In a further advantageous embodiment, the striae signal can be filtered with a filter before the preconditioning. This has the advantage that the striae signal is freed of faulty interfering signals that hinder the analysis of the striae signal. For example, a low-pass filter which allows only signals below a predetermined frequency to pass through can be used for filtering.

In addition to the method and its further embodiment explained above, the invention also relates to a monitoring device for an oil and gas lubricating device with a striae sensor, with which the temporal change in the striae can be recorded and a striae signal representative for the temporal change in the striae can be generated. In order to reduce the faultiness of the striae signal when such a monitoring device is used, a smoothening unit is provided that makes it possible to smoothen the striae signal by calculating an average value of the striae signal over a predetermined averaging interval.

The monitoring device can furthermore include a memory unit, from which an alterably storable operating and/or warning limit can be read during operation.

BRIEF DESCRIPTION OF THE DRAWINGS

In the following, the invention is explained by way of example, using an embodiment with reference to the accompanying drawings. In this process, according to the embodiments that are described above, each of which is to be considered as an advantageous embodiment, individual features may be left out and/or freely combined with one another.

Shown are.

DESCRIPTION OF THE PREFERRED EMBODIMENT

Figure 1:
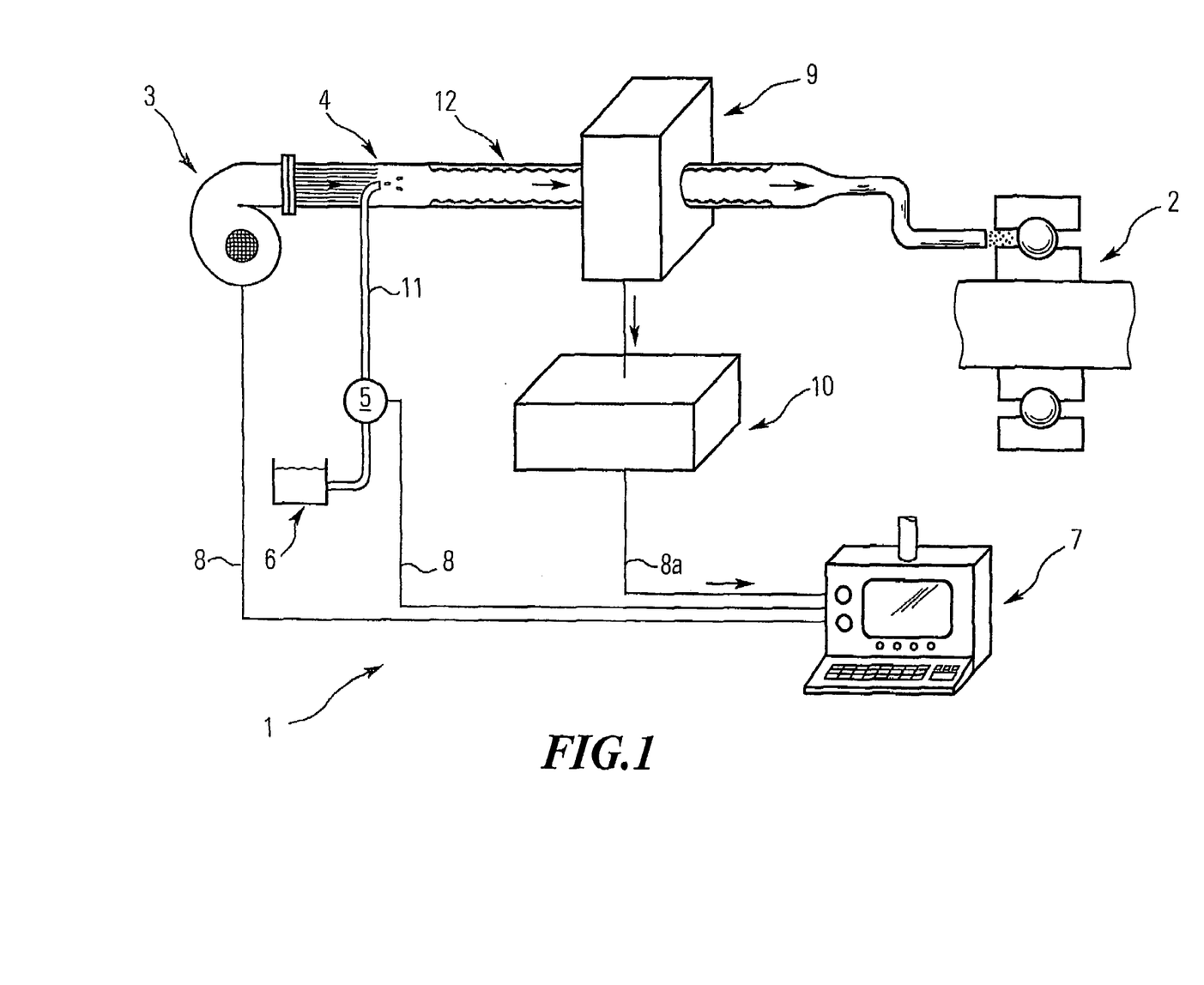
FIG. 1 a schematic depiction of an oil and gas lubricating device in which the method according to the invention can be used.

FIG. 1 shows an oil and gas lubricating device 1, in which the method according to the invention is used and by which a lubrication point 2 is lubricated. The lubrication point 2 is shown, by way of example, as a spindle bearing of, for example, a machine tool.

The oil and gas lubricating device 1 shown in FIG. 1 by way of example contains a compressor unit 3 that creates an airflow in a supply line 4, an oil pump 5 that pumps oil from an oil tank 6 into the supply line 4, a control unit 7 that regulates the oil and gas lubricating device 1 and that is connected to the described units via signal lines 8, a sensor unit 9 and an evaluation unit 10, with which the method according to the invention is applied.

Oil is conveyed from the oil tank 6 into the supply line 4 by the oil pump 5 via an oil line 11. Oil is carried along from the opening of the oil line 11 by the airflow generated by the compressor unit 3 and conveyed in the form of striae 12, i.e., an oil film with a thickness that changes with time, along a wall of the supply line 4 in the direction of the lubrication point 2. The sensor unit 9 that is arranged around the supply line 4 in FIG. 1 by way of example and the evaluation unit 10 serve to monitor the oil and gas lubricating device 1 with the help of the method according to the invention. The analysis unit 10 is connected to the control unit 7 via the signal line 8a. The control unit 7 receives an operating signal or a warning signal from the evaluation unit 10 via the signal line 8a, which signal represents the status of the monitoring of the oil and gas lubricating device 1.

Figure 2:
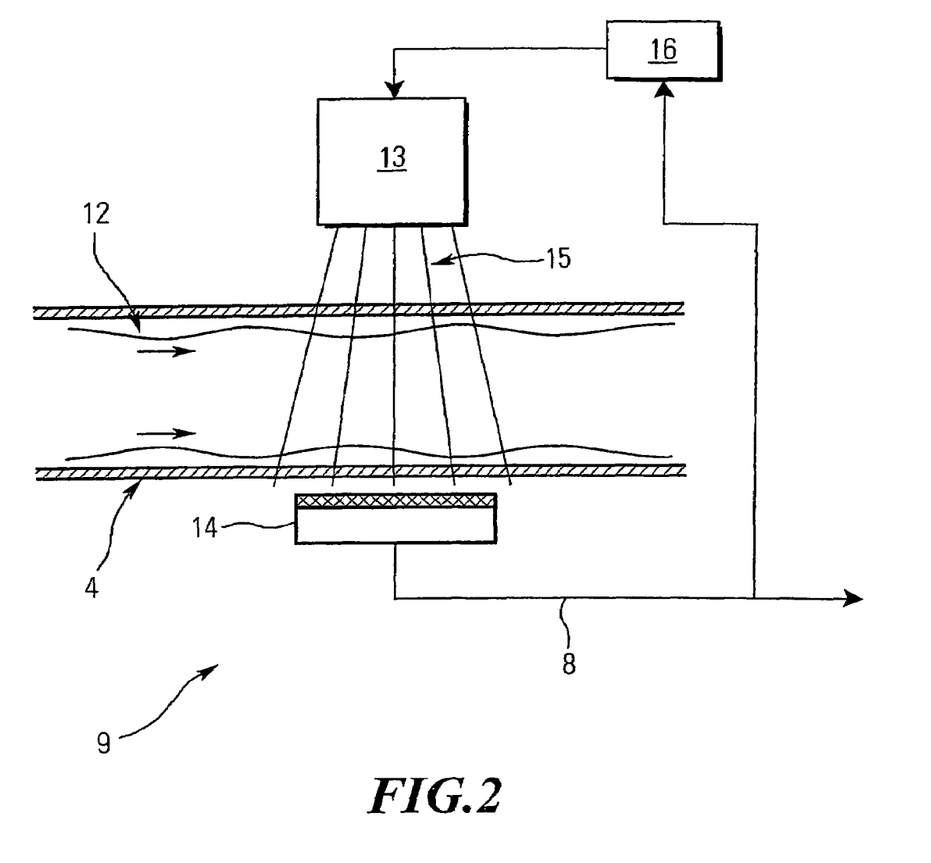
FIG. 2 a schematic depiction of an exemplified supply line of the oil and gas lubricating device in which the method according to the invention can be used, with a striae sensor and a light source in an exemplified depiction.

In FIG. 2, the sensor unit 9 according to the invention is shown by way of example. A light source 13 and a striae sensor 14 are arranged around the supply line 4, in which the striae 12 move. The depiction is only by way of example; it is, for example, also possible that the light source 13 is a part of the striae sensor 14 and that the striae sensor detects reflected light. The supply line 4 is designed transparently in the area of the sensor unit 9 and can, for example, be a glass tube. The light source 13 generates a beam of light 15 that is constant in its intensity and that emits rays through the supply line 4 in the direction of the striae sensor 14. Light source 13 and striae sensor 14 are diametrically arranged, on either side of the supply line 4. The intensity of the beam of light 15 is changed by the transparent supply line 4 and the striae 12 when it penetrates through them. The transparent supply line 4 represents a constant change in intensity here, but the change in intensity of the beam of light caused by the striae 12 fluctuates with the temporal change in the striae. Therefore, the beam of light 15, after it has passed through the supply line 4 and the striae 12 and reaches the striae sensor 14, is representative for the striae 12. The striae sensor 14, which is a photoreceiver in the embodiment shown by way of example, generates a striae signal that is representative for the striae 12 and that is passed on to the evaluation unit 10.

During calibration, the light intensity of the light source 13 is adjusted with a regulator 16 in such a way that the light intensity that reaches the striae sensor 14 lies in a predetermined area of the striae sensor 14. Furthermore, during calibration and with the help of the regulator 16, a defined fluctuating light intensity can be generated at the striae sensor 14, in order to test the function and the result of the downstream evaluation unit 10.

Figure 3:
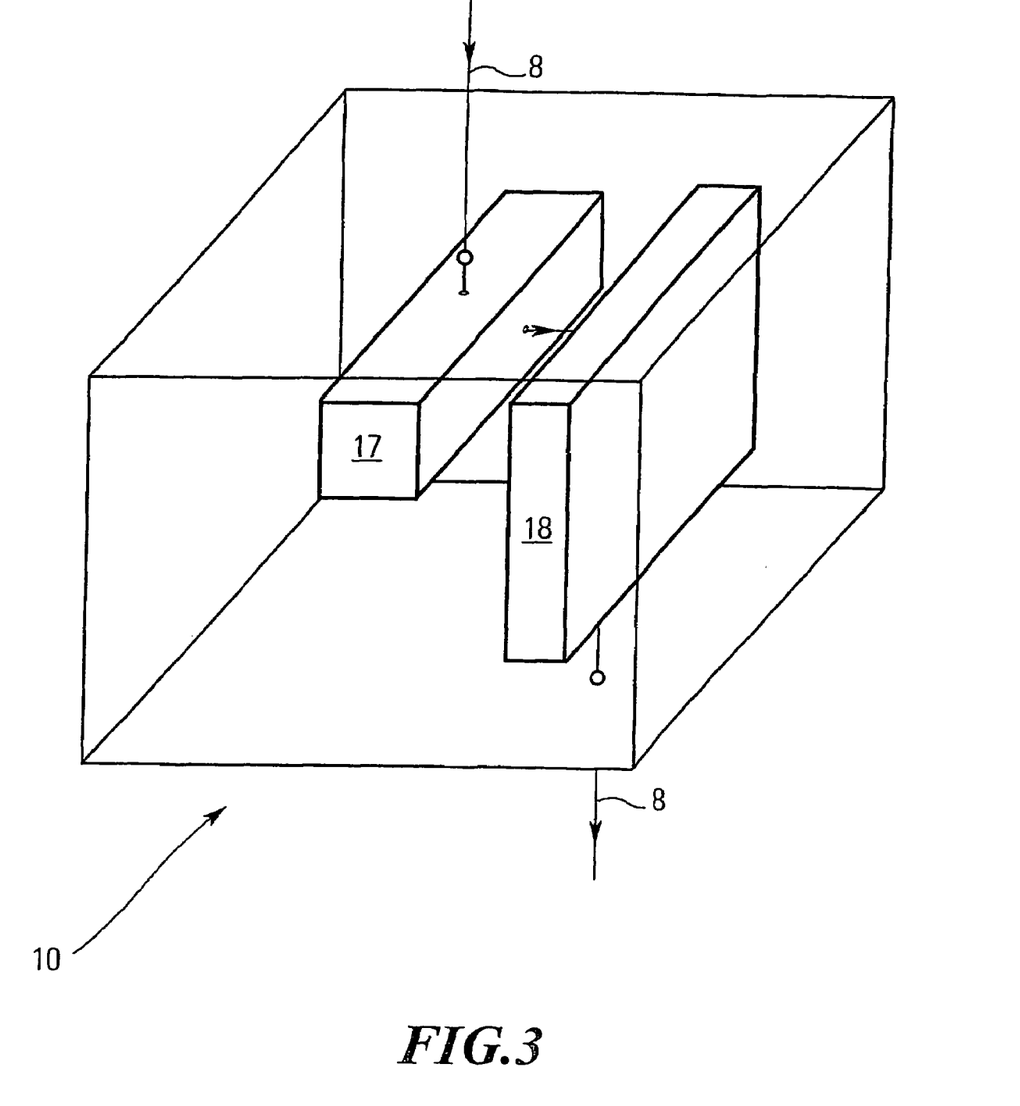
FIG. 3 a schematic depiction of an embodiment of an analysis unit according to the invention.

FIG. 3 shows an embodiment of the evaluation unit 10 depicted in FIG. 1. This comprises a signal preparation unit 17 and a signal output unit 18.

Figure 4:
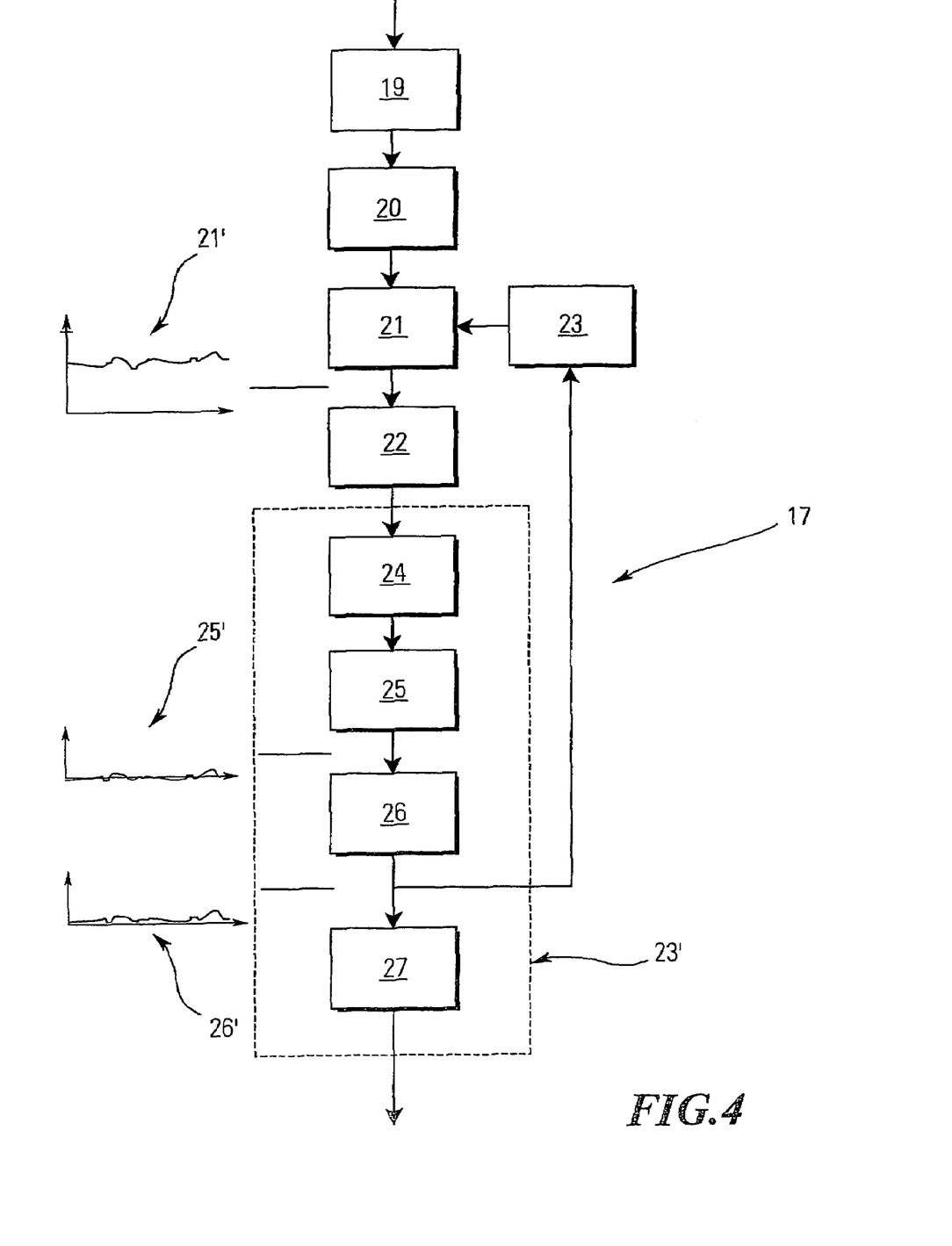
FIG. 4 a schematic depiction of a signal preparation unit according to the invention.

FIG. 4 schematically shows the exemplified setup of the signal preparation unit 17 according to the invention, with which the striae signal generated in the sensor unit 9 is prepared.

The signal preparation unit 17 can have a preamplifier 19, by which the striae signal is amplified with a predetermined preamplification factor. The striae signal is then passed on to a filter 20, which filters out certain frequency ranges of the striae signal that are not representative for the striae 12. For example, a low-pass filter that allows only signals below a predetermined frequency to pass can be used here.

The filtered striae signal is then passed on to a main amplifier 21. The main amplifier 21 has a variably adjustable main amplifier factor, by means of which the raw striae signal can be amplified to a predetermined raw signal value. In the exemplified embodiment, this predetermined raw signal value complies with an average input range of an analogue-digital converter 22, to which the striae signal is sent next. The analogue-digital converter 22 digitalizes the analogue striae signal. In order for the main amplifier 21 always to amplify the striae signal to a raw signal value predetermined for the input level of the analogue-digital converter 22, a raw signal level regulator 23 changes the variable main amplification factor of the main amplifier 21. In a first striae signal diagram 21', the striae signal after the amplification by the main amplifier 21 is depicted by way of example. The analogue-digital converter 22 samples the raw striae signal at a predetermined frequency and outputs a digital value with each sampling.

In the following, various units for performing a preconditioning of the striae signal in a preconditioning module 23' are described by way of example:

The striae signal is passed on to a first preconditioning unit 24, which calculates an average value over a predetermined time interval.

The striae signal is then passed on to a second preconditioning unit 25. This has the task of removing the constant portion from the striae signal. To do this, an average is calculated over a predetermined time interval and the result is subtracted from the striae signal. This second preconditioning unit 25 changes the striae signal in such a way that there is an offset compensation. A second striae signal diagram 25' shows, by way of example, the striae signal after the second preconditioning unit 25.

The striae signal is passed on to a third preconditioning unit, which is a rectifier 26. This rectifier 26 converts negative striae signals into their positive equivalents, as a result of which a striae signal is created that is always positive, without exception. A third striae signal diagram 26' shows the striae signal after the rectifier 26 by way of example. The rectified striae signal next reaches a fourth preconditioning unit, which is a compensator 27. This compensator 27 divides the preconditioned striae signal by the main amplifier factor with which the raw striae signal was amplified in the main amplifier 21. This compensates for the amplification carried out in the main amplifier 21.

The preconditioned striae signal is passed on to the signal output unit 18, representing the completion of the preconditioning of the striae signal.

Figure 5:
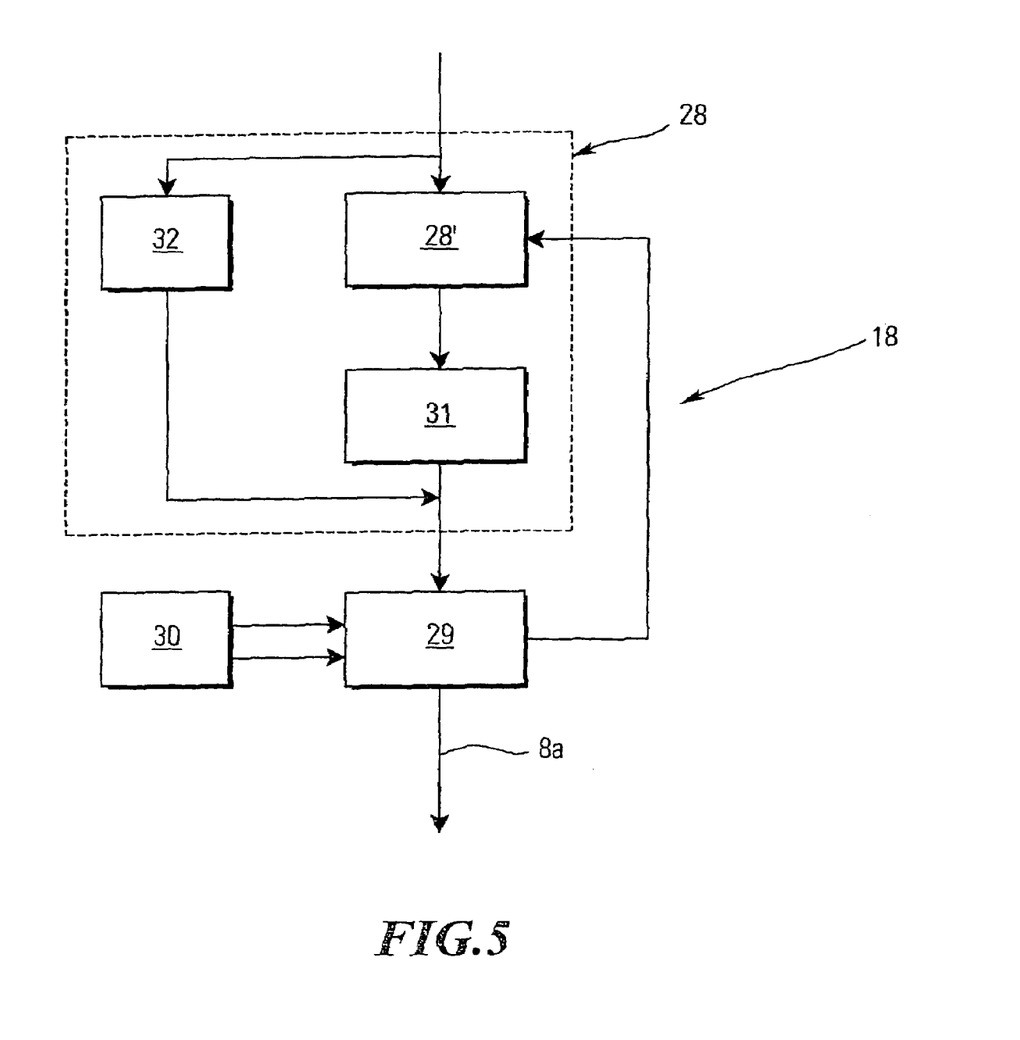
FIG. 5 a schematic depiction of a signal output according to the invention.

The signal output unit 18 shown by way of example in FIG. 5 contains a smoothening unit 28, which the preconditioned striae signal reaches first. In a calculation unit 28', the smoothening unit 28 calculates an average value of the striae signal over a predetermined averaging interval and, in this way, smoothes the striae signal. In this connection, it is possible to reduce the averaging interval from a long time interval to a short time interval. Whether the long time interval or the short time interval is used for the calculation is determined by a signal evaluation unit 29. The signal analysis unit 29 outputs an operating or warning signal via the signal line 8a, which signal informs the control unit 7 of the status of the monitoring of the oil and gas lubricating device. If the warning signal is output, the averaging interval is reduced to the short time interval in the calculating unit 28' of the smoothening unit 28. The smoothened striae signal is evaluated in the signal analysis unit 29. For this purpose, the smoothened striae signal is compared to a predetermined operating limit, which is representative for an oil film that is sufficient for lubrication point lubrication appropriate for operation. If the smoothened striae signal is larger than this operating limit, the operating signal is output.

Furthermore, the smoothened striae signal is compared to a warning limit in the signal analysis unit 29, which warning limit is representative for an oil film that is not sufficient for lubrication point lubrication appropriate for operation. If the smoothened striae signal falls below this warning limit, the warning signal is output. If the smoothened striae signal ranges between the operating and warning limits, the operating or warning signal, respectively, is not changed and the most recently output signal continues to be present.

A memory unit 30 is connected to the signal evaluation unit 29; the operating and warning limits can be read from this memory unit 30 by the signal evaluation unit 29. For example, to specify the operating limit, an oil film that is sufficient for lubrication point 2 lubrication appropriate for operation is adjusted. A normalization signal is generated by pressing a certain combination of keys on a keyboard of the control unit 7. If the normalization signal is applied to the memory unit 30, the striae signal present at this time is specified as the operating limit in the memory unit 30, for example. The warning limit can be input to the memory unit 30 as a percentage or absolute deviation from the operating limit.

Furthermore, the smoothening unit 28 contains a temperature compensator 31. This temperature compensator 31 compensates for temperature influences on the oil of the oil film.

For this, the current oil film temperature is measured by a connected temperature registration unit (not shown), e.g., a resistance thermometer. If there is a deviation between the current oil film temperature and an oil film temperature saved when the limits are specified in the memory unit 30, the striae signal is changed during the smoothening by adding or subtracting predetermined temperature-dependent characteristic values.

Figure 6:
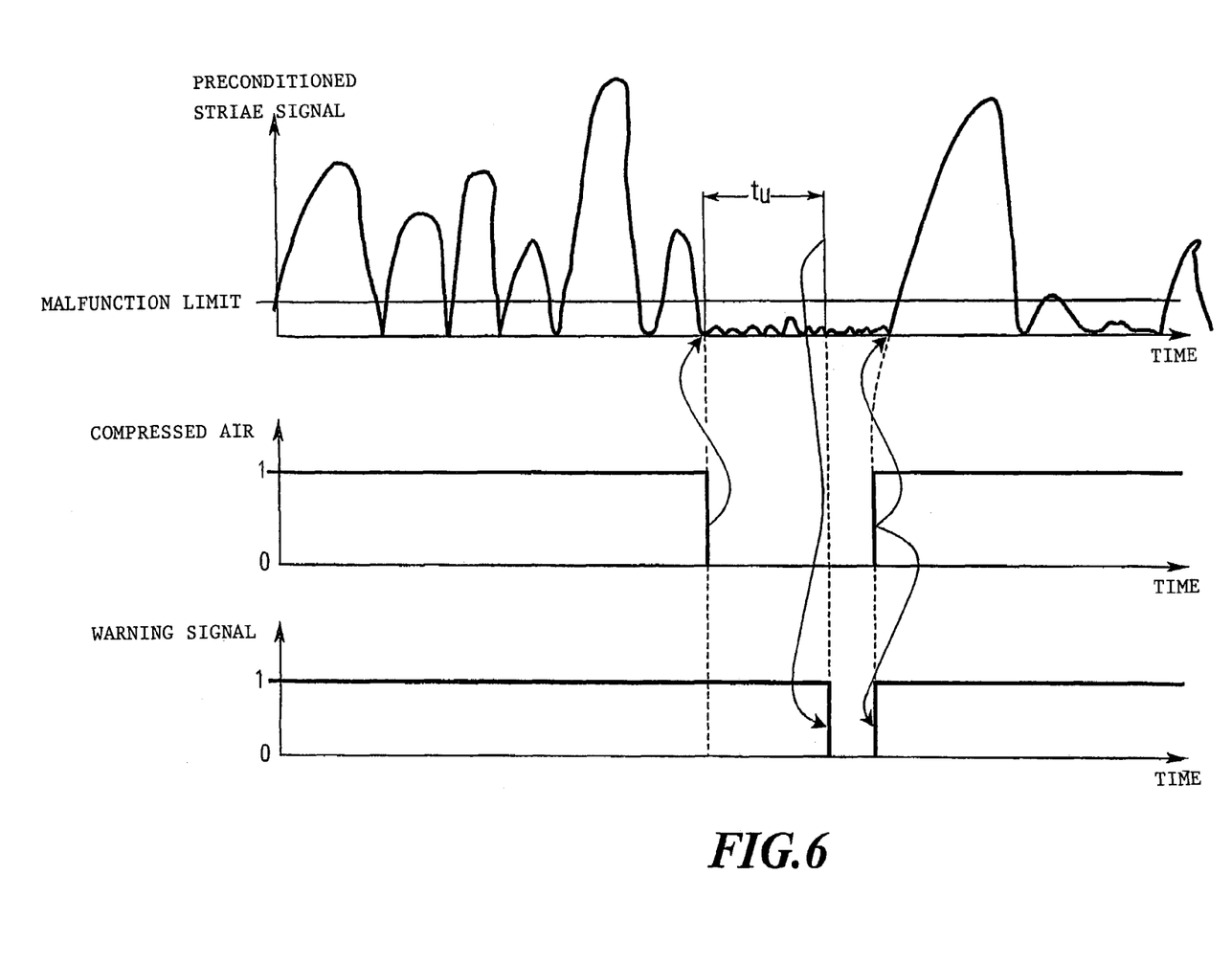
FIG. 6 a schematic depiction of the signal waveforms when there is a malfunction in the compressed air.

In addition, the smoothening unit 28 contains a compressed air monitoring unit 32, which checks for the presence of a sufficient airflow within the supply line 4 using the preconditioned striae signal. For this, the preconditioned striae signal is compared to a predetermined malfunction limit in the compressed air monitoring unit 32. If the signal falls below the malfunction limit over a predetermined time period $t_{tc}$, the warning signal is output in the signal analysis unit 29. The signal waveforms in case of a malfunction in the compressed air are shown in FIG. 6 by way of example.

The invention claimed is:

1. Method for monitoring an oil and gas lubricating device, with which an oil film, while forming striae, can be conveyed by an airflow along a wall of a supply line to a lubrication point, comprising:

detecting a temporal change in the striae by a striae sensor;

generating a striae signal that is representative for the temporal change in the striae; and smoothening the striae signal by calculating an average value of the striae signal over a predetermined averaging interval.

2. Method according to claim 1, which further comprises:

comparing the smoothened striae signal with a predetermined operating limit, which is representative for an oil film that is sufficient for lubrication point lubrication appropriate for operation; and outputting an operating signal if the smoothened striae signal exceeds the operating limit.

3. Method according to claim 1 or 2, which further comprises:

outputting a warning signal if the smoothened striae signal falls below the operating limit.

4. Method according to claim 1, which further comprises:

comparing the smoothened striae signal with a predetermined warning limit, which is representative for an oil film that is not sufficient for lubrication point lubrication appropriate for operation;

outputting the warning signal if the smoothened striae signal falls below the warning limit.

5. Method according to claim 1, which further comprises:

reading out the operating and/or warning limit from a memory unit.

6. Method according to claim 1, which further comprises:

specifying the operating and/or warning limit depending on a normalization signal;

specifying the smoothed striae signal as an operating and/or warning limit when the normalization signal is applied.

7. Method according to claim 1 which further comprises:

specifying the operating or warning limit as a percentage or absolute deviation of the respective other limit.

8. Method according to claim 1, which further comprises:

automatically shortening the averaging interval when the warning signal is being output;

specifying a long time interval and a short time interval for the averaging interval.

9. Method according to claim 1, which further comprises:

generating the striae signal representative of the temporal change in the striae using opto-electronic means.

10. Method according to claim 1, which further comprises:

measuring the temperature of the oil film;

saving the temperature of the oil film when specifying the operating or warning limit;

smoothening the striae signal depending on a difference in the temperatures of the saved and measured temperature of the oil film.

11. Method according to claim 10, which further comprises:

adding and subtracting temperature-dependent characteristic values to or from the striae signal during the smoothening of the striae signal.

12. Method according to claim 1, which further comprises:

comparing the unsmoothened striae signal with a predetermined malfunction limit that is representative for a striae signal when a malfunction in the airflow occurs during the smoothening of the striae signal;

outputting the warning signal if the unsmoothened striae signal falls below the malfunction limit.

13. Method according to claim 1, which further comprises:

preconditioning the striae signal before the smoothening of the striae by calculating an average value of the unsmoothened striae signal over a predetermined time interval.

14. Method according to claim 1, which further comprises:

preconditioning the striae signal before the smoothening by removing the constant portion from the unsmoothened striae signal.

15. Method according to claim 1, which further comprises:

preconditioning of the striae signal before the smoothening by rectifying the unsmoothened striae signal.

16. Method according to claim 1, which further comprises:

amplifying the striae signal, depending on the preconditioned striae signal, to a predetermined average raw signal value.

17. Method according to claim 16, which further comprises:

compensating the amplification of the raw signal value by attenuating the preconditioned striae signal.

18. Method according to claim 1, which further comprises:

detecting a beam of light directed through the striae;

generating the striae signal depending on the beam of light.

19. Method according to claim 1, which further comprises:

generating the beam of light directed through the striae by means of a light source.

20. Method according to claim 17, which further comprises:

calibrating the striae signal by regulating the light intensity of the light source.

21. Method according to claim 17, which further comprises:

calibrating the striae signal by regulating the light intensity of the light source to a predetermined test intensity.

22. Method according to claim 1, which further comprises:

filtering the raw striae signal by a filter.

23. A monitoring device for an oil and gas lubricating device, wherein with the oil and gas lubricating device, an oil film, while forming striae, can be conveyed by an airflow along a wall of a supply line to a lubrication point, and the monitoring device is provided with a striae sensor, with which the temporal change in the striae can be detected and a striae signal can be generated that is representative of the temporal change in the striae, which comprises a smoothening unit, by means of which the striae signal is smoothened and an average value of the striae signal over a predetermined averaging interval is calculated.

24. Monitoring device according to claim 23, wherein the monitoring device includes a memory unit, from which an alterably storable operating and/or warning limit is readable during operation.

* * * * *

UNITED STATES PATENT AND TRADEMARK OFFICE
CERTIFICATE OF CORRECTION

| | |
|---|---|
| PATENT NO. | : 7,475,604 B2 |
| APPLICATION NO. | : 10/560895 |
| DATED | : January 13, 2009 |
| INVENTOR(S) | : Spiess |

It is certified that error appears in the above-identified patent and that said Letters Patent is hereby corrected as shown below:

On the title page, Item (30), The Foreign Application Priority Data has been omitted. Item (30) should read:

-- (30)     Foreign Application Priority Data

Jun. 16, 2003     (DE) ............................... 103 27 329.8 --

Signed and Sealed this

Twenty-fourth Day of March, 2009

JOHN DOLL
*Acting Director of the United States Patent and Trademark Office*